Patented Feb. 18, 1947

2,416,051

UNITED STATES PATENT OFFICE 2,416,051

ANTIFOGGING COMPOSITION

Richard L. Gilbert, Jr., Old Greenwich, Conn., assignor to American Cyanamid Company, New York, N. Y., a corporation of Maine No Drawing. Application June 3, 1943,
Serial No. 489,497

3 Claims. (Cl. 117—121)

This invention relates to anti-fogging agents for transparent surfaces such as glass or the transparent resins such as methyl methacrylate used in the windshields of automobiles, airplanes, etc., and in optical instruments. A principal object of the invention is the provision of an anti-fogging agent that is much more permanent than those that have previously been used, and which will therefore maintain its effectiveness for longer periods of time. The invention will be described with particular reference to military uses, but it should be understood that the advantages thereof are also important for other purposes and can be obtained whenever it is desired to maintain a transparent surface free from fog or condensed moisture under changing conditions or temperature or humidity.

An anti-fogging material is required at the present time to maintain the line of sight free from fog on transparent solid surfaces of airplanes. Thus, for example, during the flight of a dive bomber from an altitude of about 8,000 feet (temperature about 32° F.) to sea level, the sudden change in temperature and relative humidity of the air results in a condensation of moisture on the windshield and also on the lenses of the bombsight, and this seriously interferes with the effectiveness of the attack. The principal loci of fog are on the surfaces of the aviator's goggles and on the external and internal surfaces of the lenses in the telescope. An anti-fogging agent must not only function during the dive, but it must also continue to function in flight and after the optical equipment has been stored on the ground, and the hot, humid atmosphere of the South Pacific and other tropical combat areas causes this problem to be particularly severe.

The anti-fogging agent that has been most widely used by the aviation forces of the United States, Canada and Great Britain is sodium di-(2-ethyl-hexyl) sulfosuccinate, a compound that is also in wide commercial use as a wetting agent under the trade name "Aerosol OT." I have now discovered that the surface-active esters of sulfotricarballylic acid, and especially the triesters of this acid with alcohols of 4 to 8 carbon atoms, are not only as good anti-fogging agents as those previously used, but that they are much more permanent in character and will retain their effectiveness for much longer periods of time. My invention, therefore, consists in the provision of an anti-fogging composition containing as its principal essential ingredient a surface-active ester of sulfotricarballylic acid, either alone or in admixture with certain modifying agents or adhesives that will subsequently be described, and in the application of these compositions to transparent materials such as glass, methyl methacrylate and the like.

Although any surface-active ester of sulfotricarballylic acid may be used in practicing the invention, the best results are obtained with triesters. The trialkyl esters, which produce the best results, are compounds of the formula

$$MO_3S.Al.(CO)_3R_1R_2R_3$$

in which M is hydrogen or a salt-forming base such as sodium, ammonium, potassium and the like, Al is a aliphatic carbon chain of at least 3 carbon atoms and $R_1$, $R_2$ and $R_3$ are alcohol radicals such as oxyalkyl and oxycycloalkyl radicals. They are prepared by reacting the corresponding esters of aconitic acid with sodium sulfite or sodium bisulfite while suspended in a mixture of water and ethyl alcohol. The sulfonated products in their pure form are slightly yellowish, wax-like solids that are difficultly soluble in water but possess excellent surface-active properties. When these compounds are applied to glass, methyl methacrylate and similar solid, transparent surfaces they form a thin film that does not change the optical properties of the surface but protects it against the formation of fog upon sudden changes in temperature and relative humidity.

The sulfotricarballylic esters may be applied to the glass or other transparent surface by any suitable method. They may be applied as such or as solutions in water, ethyl alcohol, carbon tetrachloride, solvent naphtha or other organic solvents. One convenient method is to impregnate cloth, paper, felt, sponge or other absorbent material with the ester, as by soaking in a strong alcohol solution and drying, after which the absorbent material may be rubbed over the glass to apply a thin film of the wetting agent thereto.

The most suitable sulfotricarballylic acid esters for use in practicing the invention are the trialkyl sulfotricarballylates and particularly triamyl sodium sulfotricarballylate, trihexyl sodium sulfotricarballylate and triheptyl sodium sulfotricarballylate. The tributyl and trioctyl esters produce films on glass, that have greater permanency than "Aerosol OT," but even these are excelled by the amyl, hexyl and heptyl esters. Accordingly, the preferred compounds for use in practicing our invention are the esters of sulfotricarballylic acid with aliphatic alcohols of 5–7 carbon atoms inclusive.

The permanency of the compounds of the invention is shown by the following test: a small amount of solution of the material to be tested, either in water or in organic solvent, is swabbed onto a clean glass slide and allowed to dry. When necessary the film is then polished until it is completely transparent. The slide is chilled to about 0° C. and then dropped into a moist atmosphere of 35° C. above hot water contained in a flask. A Bureau of Standards 25X test chart is viewed through the slide while the latter is maintained in the warm, saturated atmosphere and the number of lines per inch legible after 10 seconds is recorded. In general, the maximum number of lines (56 per inch) can be read through an efficient anti-fog material.

In order to determine the permanency of the material under test the coated slide is dipped into distilled water, allowed to drain and dry, and again tested. "Aerosol OT," when tested by this method, permitted complete visibility before dipping, but the slide became fogged within 5 seconds upon a second test when it had first been dipped in water and dried. Tri-n-hexyl sodium sulfotricarballylate, on the other hand, provided complete visibility (56 lines per inch on the chart) both originally and after having been dipped in water and dried, and the slide remained resistant to fogging for 9 seconds even after it had been dipped and dried 3 successive times. Comparable results were obtained with the triamyl and triheptyl esters.

The permanency of the anti-fogging agents of the present invention can be further increased by applying them in conjunction with an adhesive such as casein, gum tragacanth, Irish moss, agar-agar and the like. Thus, for example, 4% of the wetting agent may be dispersed in a 1% aqueous solution of casein containing a preservative such as sodium pentachlorphenate and sufficient ammonia to dissolve the casein. Films formed by swabbing this dispersion upon glass, drying and polishing withstood 3 dips in water without any fogging whatsoever in subsequent tests and the same result was obtained with gum tragacanth. The films also withstood storage for 90 hours at 85° F. in an atmosphere of 95% relative humidity.

What I claim is:

1. A solid transparent material having applied to a surface thereof a thin fog-inhibiting coating comprising, as the principal effective anti-fogging agent therein, a surface-active ester of sulfotricarballylic acid.

2. A solid transparent material having applied to a surface thereof a thin fog-inhibiting coating comprising, as the principal effective anti-fogging agent therein, a surface-active triester of sulfotricarballylic acid with an aliphatic alcohol of 4–8 carbon atoms.

3. A method of inhibiting the formation of fog on solid transparent material which comprises coating said material with a thin anti-fogging film containing a triester of sulfotricarballylic acid with an aliphatic alcohol of 4–8 carbon atoms as the principal anti-fogging agent therein, said film exhibiting its original fog-inhibiting properties after dipping in water.

RICHARD L. GILBERT, Jr.

REFERENCES CITED

The following references are of record in the file of this patent:

UNITED STATES PATENTS

| Number | Name | Date |
| --- | --- | --- |
| 2,292,097 | Vollmer | Aug. 4, 1942 |
| 2,315,375 | Nawiasky et al. | Mar. 30, 1943 |
| 1,369,708 | Roberts | Feb. 22, 1921 |
| 2,353,978 | Weber | July 18, 1944 |
| 2,372,171 | Bennett | Mar. 27, 1945 |
| 2,365,297 | Schweizer | Dec. 19, 1944 |
| 2,159,313 | Blair et al. | May 23, 1939 |

FOREIGN PATENTS

| Number | Country | Date |
| --- | --- | --- |
| 835,187 | French | Dec. 14, 1938 |
| 215,929 | British | May 22, 1924 |
| 524,987 | British | Aug. 20, 1940 |